(12) United States Patent
Graham et al.

(10) Patent No.: US 6,461,265 B1
(45) Date of Patent: Oct. 8, 2002

(54) COAXIAL GEAR BOX

(75) Inventors: John Graham, Clinton Township; Robert B. Raible, Ortonville, both of MI (US)

(73) Assignee: Ex-Cello Machine Tools, Inc., Sterling Heights, MI (US)

( * ) Notice: Subject to any disclaimer, the term of this patent is extended or adjusted under 35 U.S.C. 154(b) by 0 days.

(21) Appl. No.: 09/497,023

(22) Filed: Feb. 2, 2000

(51) Int. Cl.[7] ............................. F16H 3/72; F16H 29/02
(52) U.S. Cl. ................................. 475/5; 74/89.23
(58) Field of Search ............................ 475/5, 151, 269; 74/826, 89.23, 89.29

(56) References Cited

U.S. PATENT DOCUMENTS

| | | | | |
|---|---|---|---|---|
| 2,030,761 A | * | 2/1936 | Pedemonte ................ | 475/5 X |
| 2,363,201 A | * | 11/1944 | Popoff ........................... | 475/5 |
| 2,578,015 A | * | 12/1951 | Reinhard .................... | 475/5 X |
| 3,225,626 A | * | 12/1965 | Geyer ..................... | 74/89.23 X |
| 3,761,070 A | * | 9/1973 | Ruf ............................. | 475/5 X |
| 3,788,165 A | * | 1/1974 | Klotsvog .................... | 475/5 X |
| 3,872,738 A | * | 3/1975 | Price et al. ........... | 74/388 R X |
| 3,979,971 A | * | 9/1976 | Generke et al. .............. | 74/626 |
| 4,090,416 A | * | 5/1978 | Hicks ............................ | 475/5 |
| 4,096,763 A | | 6/1978 | Kell ............................... | 74/69 |
| 4,400,118 A | | 8/1983 | Yamakage et al. ............. | 408/3 |
| 4,685,354 A | * | 8/1987 | McCabria ...................... | 475/5 |
| 4,726,259 A | | 2/1988 | Idler ............................ | 74/785 |
| 4,760,964 A | | 8/1988 | Burandt ................ | 239/265.19 |
| 4,779,486 A | * | 10/1988 | Schumacher ................... | 475/5 |
| 4,852,479 A | * | 8/1989 | Hubbard ................ | 74/89.15 X |
| 4,858,491 A | * | 8/1989 | Shube ................... | 74/89.15 X |
| 4,939,949 A | * | 7/1990 | Langenberg ............... | 475/5 X |
| 5,029,655 A | * | 7/1991 | Ebeling ..................... | 475/5 X |
| 5,080,635 A | * | 1/1992 | Martinez et al. ................ | 475/5 |
| 5,669,842 A | * | 9/1997 | Schmidt ........................ | 475/5 |
| 5,704,864 A | | 1/1998 | Yanagisawa ................ | 475/149 |
| 5,916,050 A | * | 6/1999 | Coutant et al. ................ | 475/5 |
| 5,931,757 A | * | 8/1999 | Schmidt .................... | 475/5 X |
| 5,957,798 A | * | 9/1999 | Smith, III et al. ...... | 74/89.15 X |
| 6,193,625 B1 | * | 2/2001 | Ullrich et al. ................. | 475/5 |

FOREIGN PATENT DOCUMENTS

| IT | 366847 | * | 5/1939 | .................... 475/5 |
|---|---|---|---|---|

* cited by examiner

*Primary Examiner*—Charles A. Marmor
*Assistant Examiner*—Roger Pang
(74) *Attorney, Agent, or Firm*—Wood, Herron & Evans LLP (57) ABSTRACT

A gear drive apparatus includes a first shaft and a second shaft concentric to the first shaft. First and second planetary gear systems are provided for driving the first and second shafts in synchronized rotation with respect to one another with a primary drive input and for selectively driving the first and second shafts in unsynchronized rotation with respect to one another in response to a secondary drive input. Each of the first and second planetary gear systems include a ring gear, a sun gear positioned within the ring gear, and a plurality of planetary gears positioned within the ring gear and between the ring gear and the sun gear. Each ring gear can include inwardly directed gear teeth portions identical to one another. Each plurality of planetary gears can be identical to one another, and each sun gear can be identical to one another. A control mechanism can be provided in communication with the primary and secondary drive inputs for coordinating the primary and secondary drive inputs to selectively produce synchronized and unsynchronized rotation of the first and second shafts with respect to one another. A third planetary gear system can be provided for driving the first shaft longitudinally in response to unsynchronized rotation of the first shaft with respect to a nut connected to a third sun gear operably engaged by the third planetary gear system. A third drive selectively produces synchronized and unsynchronized rotation of the nut with respect to the first shaft.

31 Claims, 4 Drawing Sheets

COAXIAL GEAR BOX

FIELD OF THE INVENTION

The present invention relates to an epicyclic gear train, or planetary gear drive apparatus for transmitting synchronized rotation to first and second concentric shafts and for selectively controlling unsynchronized relative rotation between the first and second shafts.

BACKGROUND OF THE INVENTION

A drive apparatus is required for electrically driven tool compensators for moving a tool between a working position and a retracted position in combination with gauging equipment that signals a predetermined increment of tool travel each time tool adjustment is needed. Typically, the tool is moveable radially outward and inward in response to an axial movement of a draw bar. An electric motor with a gear reducer drives a screw nut assembly connected to the draw bar so that the draw bar is moved back and forth along the longitudinal axis of the draw bar, where the direction of movement is determined by the direction of rotation of the motor. The nut is formed to a cylindrical shape and has an interior cavity with a threaded opening. The drive nut is slidably mounted within the housing cavity and a draw bar assembly is removably affixed to the nut so that the draw bar moves axially as the nut rotates. A boring bar is conventionally secured to the draw bar and is operable to provide for radial inward and outward movement of a cutting tool. A cam on the boring bar is operated in response to axial movement of the draw bar in one direction to flex a strip member and move the tool radially outwardly toward the workpiece.

The drive apparatus for known tool compensator configurations is complicated and provides only limited longitudinal movement of the boring bar and connected draw bar. If additional movement could be provided, more intricate profiles could be cut. Additional movement could also provide more efficient cutting operations by allowing multiple cuts to be simultaneously performed at different radial positions at the same time. It is desirable to provide a drive apparatus with an accurate, reliable, and repeatable positioning movement of the radially moveable body member supporting the tool.

SUMMARY OF THE INVENTION

A gear drive apparatus according to the present invention includes first and second elongate, concentric, rotatable, spindles or shafts. A planetary gear transmission drives the first and second shafts in synchronized rotation with respect to one another with a primary drive input and selectively drives the first and second shafts in unsynchronized rotation with respect to one another in response to a secondary input. A control system in communication with the primary and secondary drive inputs coordinates the primary and secondary drive inputs to selectively produce synchronized and unsynchronized rotation of the first and second shafts with respect to one another.

The planetary gear transmission can include a first planetary gear group having a first ring gear, a first sun gear positioned within the first ring gear, and a plurality of first planetary gears positioned within the first gear ring and between the first gear ring and the first sun gear. The planetary gear transmission can also include a secondary planetary gear group positioned coaxially with respect to the first planetary gear group and having a second ring gear positioned coaxially with respect to the first ring gear, a second sun gear positioned within the second ring gear and positioned coaxially with respect to the first sun gear, and a plurality of second planetary gears equal in number to the plurality of first planetary gears and positioned within the second ring gear between the second sun gear and the second ring gear. The first and second planetary gears are mounted on common individual shafts for each mated pair of first and second planetary gears. A spider cage supports the common individual shafts for each matched pair of first and second planetary gears permitting idler movement with respect to the first and second sun gears and corresponding first and second ring gears in response to rotation of one of the first and second sun gears and one of the first and second ring gears. A control circuit is in communication with a primary drive input and a secondary drive input for coordinating the primary and secondary drive inputs to selectively produce synchronized and unsynchronized rotation of the first and second sun gears with respect to one another.

A method for controlling synchronized rotation of elongate, concentric, rotatable first and second shafts according to the present invention includes the steps of driving the first and second shafts in synchronized rotation with respect to one another with a single primary drive input with planetary gear means, and selectively driving the first and second shafts in unsynchronized rotation with respect to one another in response to a secondary drive input with the planetary drive means. The method can also include the step of coordinating the primary and secondary drive inputs to selectively produce synchronized and unsynchronized rotation of the first and second shaft with respect to one another with control means in communication with the primary and secondary drive inputs.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

A gear drive apparatus 10 according to the present invention includes a first planetary gear group 2a, and a second planetary gear group 12b. Each planetary gear group 12a, 12b includes a ring gear 14a, 14b, a sun gear 16a, 16b, and at least one planetary gear 18a, 18b, respectively. The first ring gear 14a is preferably selectively moveable about a rotational central axis and has the first sun gear 16a positioned within the first ring gear 14a. At least one, and preferably a plurality of first planetary gears 18a are positioned within the first ring gear 14a to operably engage between the first ring gear 14a and the first sun gear 16a. The second ring gear 14b is preferably held in a stationary position and is positioned coaxial with respect to the first ring gear 14a. The second sun gear 16b is positioned within the second ring gear 14b and is coaxial with respect to the first sun gear 16a. At least one, and preferably a plurality of second planetary gears 18b are positioned within the second ring gear 14b and operably engaged between the second sun gear 16b and the second ring gear 14b. Preferably, the plurality of second planetary gears 18b are equal in number to the plurality of first planetary gears 18a. Preferably, the first and second planetary gears 18a, 18b are mounted on common individual shafts 20 for each matched pair of first and second planetary gears 18a, 18b. Alternatively, the first and second planetary gears 18a, 18b can be held in fixed relative position with respect to one another while rotating with respect to the corresponding ring gears 14a, 14b and sun gears 16a, 16b respectively. This may result in a configuration where the first and second planetary gears 18a, 18b do not include a common axis of rotation, but are fixed in a predetermined angular offset orientation with respect to the common axis for the first and second ring gears 14a, 14b as the first and second planetary gears 18a, 18b rotate and move about that common axis. This would require a cage of different structural configuration from that illustrated in FIGS. 1–3. The illustrated embodiment, best seen in FIGS. 1 and 3, includes a spider cage 22 for supporting the first and second planetary gears 18a, 18b with respect to one another and with respect to the common axis between the first and second ring gears 14a, 14b. Preferably, the cage 22 supports the common individual shafts 20 for each matched pair of first and second planetary gears 18a, 18b for movement with respect to the first and second sun gears 16a, 16b and corresponding first and second ring gears 14a, 14b in response to rotation of one of the first and second sun gears 16a, 16b and the one of the first and second ring gears 14a, 14b.

Figure 1:
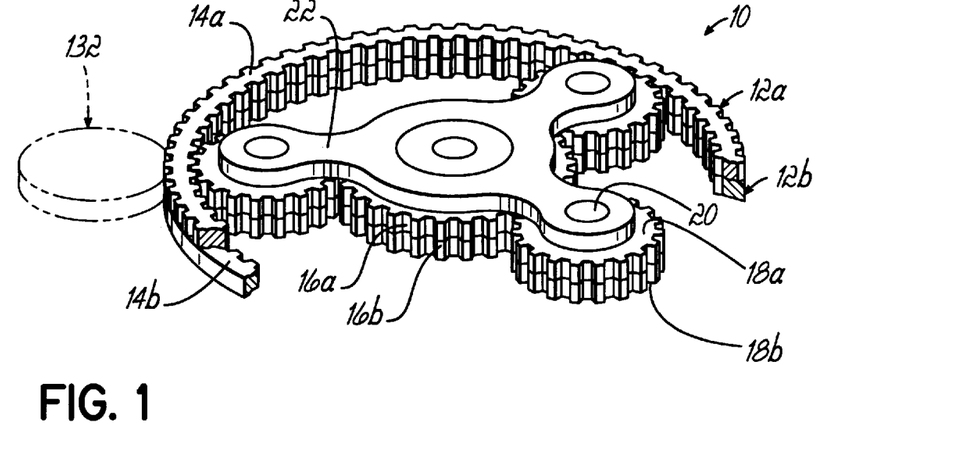
FIG. 1 is a perspective view of a planetary gear drive train according to the present invention with a portion of the first and second ring gears removed for clarity.
Figure 2:
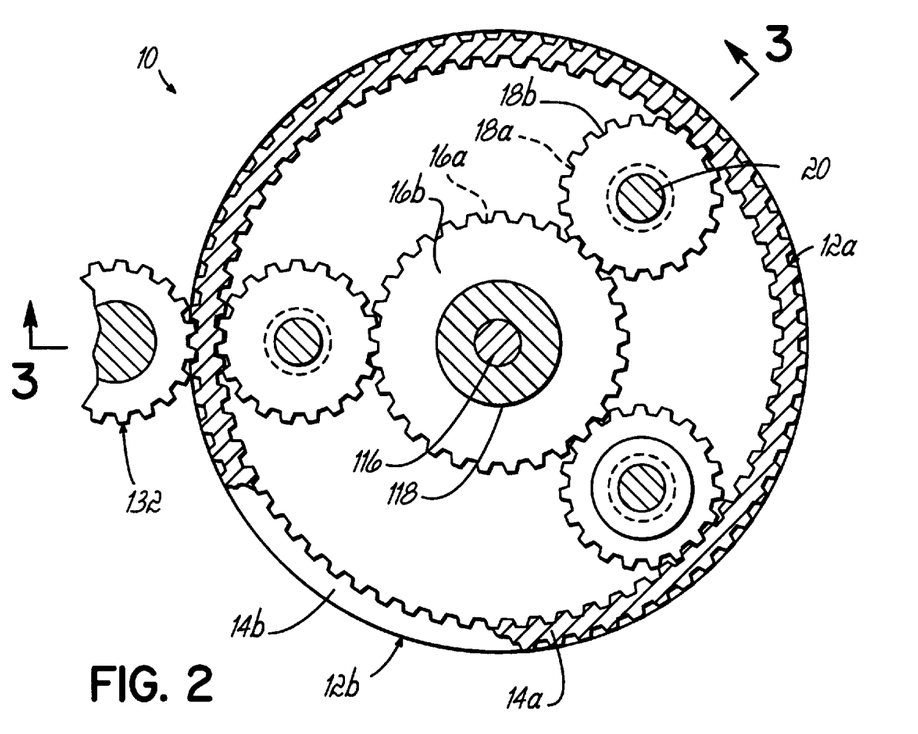
FIG. 2 is a cross-sectional view of the planetary gear drive train according to the present invention taken as shown in FIG. 3 with a portion of one ring gear removed for clarity.
Figure 3:
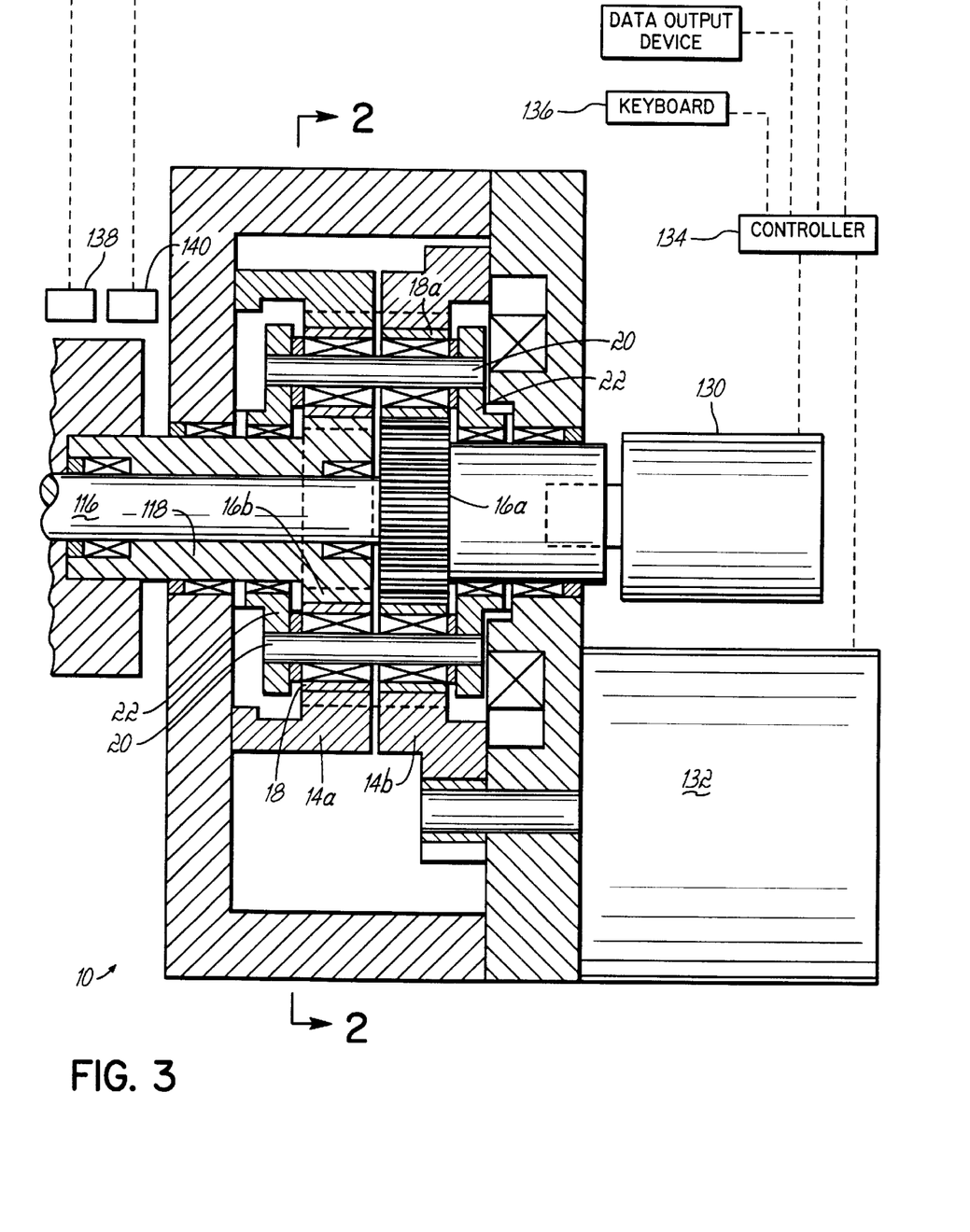
FIG. 3 is a cross-sectional view of the planetary gear drive train taken as shown in FIG. 2 according to the present invention with a control system shown schematically connected to the apparatus.

If the first sun gear 16a is driven in rotation, the first planetary gears 18a rotate in response to the rotation of the first sun gear 16a. The first planetary gears 18a meshingly engage with the first ring gear 14a causing the first planetary gears 18a to rotate about the central axis of the first ring gear 14a. The rotation of the first planetary gears 18a about the central axis of the first ring gear 14a drives the second planetary gears 18b, through movement of the common individual shafts 20 or through the structure of the cage 22, in rotation about the common central axis of the first and second ring gears 14a, 14b. The second planetary gears 18b operably engage with the second ring gear 14b causing rotation of the second planetary gears 18b about the common individual shaft 20 axis as the planetary gears 18b of cage 22 rotates about the central axis of the second ring gear 14b. The second planetary gears 18b also operably engage with the second sun gear 16b to drive the second sun gear 16b in response to the rotational input applied to the first sun gear 16a.

If the first and second planetary groups 12a, 12b are selected to be identical to one another, the rotational input of the first sun gear 16a is identical to the rotational output of the second sun gear 16b. With both the first and second ring gears 14a, 14b in stationary or fixed positions with respect to one another, the drive train of the first and second planetary gear groups 12a, 12b provide rotational output corresponding to the rotation of the first and second sun gears 16a, 16b and the rotational output is identical to one another with no differential in rotational speed. If desired, the speed differential could be set at predetermined multiples, ratios, or fractions depending on the appropriate selection of the sizes of the various gears throughout the planetary gear drive apparatus 10. If each of the gears in the first planetary gear group 12a has an identical number of gear teeth and pitch diameter to the corresponding counterpart in the second planetary gear group 12b, a differential drive can be provided by allowing one of the first and second ring gears 14a, 14b to be moveable while the other ring gear 14a, 14b is held stationary. For the purposes of illustration, and not limitation, the present invention is shown with the first ring gear 14a moveable while the second ring gear 14b is stationary. The rotational input to the first or second ring gears 14a, 14b adds or subtracts a differential rotational speed to the output of the corresponding first or second sun gears 16a, 16b. The rotation of the corresponding first or second sun gears 16a, 16b can be controlled to provide an output with a desired differential rotational speed with respect to the output of the other sun gear 16a, 16b. The controlled differential speed of the two output shafts can be used in a wide variety of devices. An exemplary apparatus capable of using a planetary gear device according to the present invention is shown and described with respect to FIG. 4 in greater detail below.

Figure 4:
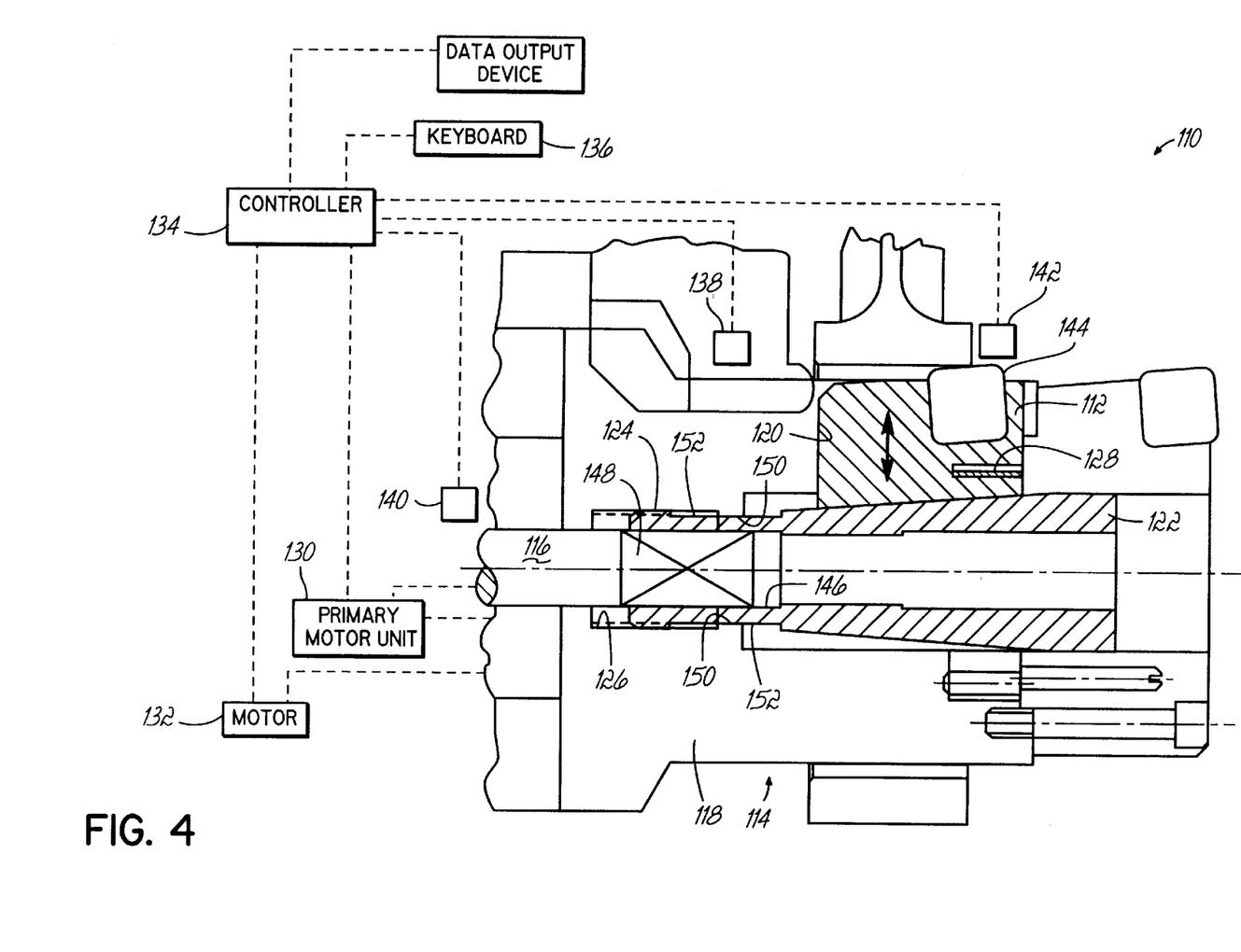
FIG. 4 is a partial cross-sectional view of an apparatus for radially adjusting a position of a tool cartridge of a machine tool driven by the planetary gear drive train according to the present invention.

Referring to FIGS. 3 and 4, a primary motor 130 can be provided for driving the first sun gear 16a in rotation, and, through the plurality of first and second planetary gears 18a, 18b in operable engagement with the first and second ring gears 14a, 14b, can drive the second sun gear 16b in synchronized rotation with the first sun gear 16a. A secondary motor 132 can be provided for selectively driving the first ring gear 14a in rotation and for selectively holding the first ring gear 14a stationary to provide the desired differential speed of rotation between the first and second sun gears 16a, 16b. The secondary motor 132 imparts selective differential speeds of rotation on the second sun gear 16b with respect to the first sun gear 16a. Depending on the direction of rotation, the secondary motor 132 can provide a negative differential speed of rotation, a zero differential speed of rotation (by holding the first ring gear 14a stationary), and a positive differential speed of rotation. The negative differential speed of rotation can be provided by rotating the first ring gear 14a in a direction opposite from the rotational direction of the individual first planetary gears 18a. A positive differential speed of rotation can be provided by rotating the first ring gear 14a in the same rotational direction as the individual first planetary gears 18a.

In the preferred configuration as illustrated in FIGS. 1–3, the first and second ring gears 14a, 14b have an identical number of gear teeth and identical pitch diameters. The plurality of first and second planetary gears 18a, 18b preferably have an identical number of gear teeth and identical pitch diameters in the illustrated embodiment. The first and second sun gears 16a, 16b preferably have an identical number of gear teeth and identical pitch diameters.

Referring now specifically to FIG. 3, the gear drive apparatus 10 according to the present invention can include control means 134 in communication with the first sun gear 16a and the first ring gear 14a for coordinating the movement of the first sun gear 16a and first ring gear 14a to selectively produce synchronized and unsynchronized rotation of the first and second sun gears 16a, 16b with respect to one another. The method according to the present invention can be used for controlling synchronized rotation of elongate, concentric, rotatable, first and second shafts 116, 118. The method would include the step of driving the first and second shafts 116, 118 in synchronized rotation with respect to one another with a single primary drive input 130 with planetary gear means 12a, 12b, and selectively driving the first and second shafts 116, 118 in unsynchronized rotation in response to a secondary drive input 132 with the planetary drive means 12a, 12b. The method can also include the step of coordinating the primary and secondary drive inputs 130, 132 to selectively produce synchronized and unsynchronized rotation of the first and second shafts 116, 118 with respect to one another with control means 134 in communication with the primary and secondary drive inputs 130, 132.

Referring now to FIG. 4, an illustrative example of a use for the gear drive apparatus 10 or planetary gear means 12a, 12b is shown. An apparatus 110 is illustrated for radially adjusting a position of a tool cartridge 112 of a machine tool 114. The machine tool 114 has rotatable, concentric, elongate, inner and outer drive spindles 116, 118 respectively. The outer drive spindle 118 includes at least one pocket 120 extending through the outer drive spindle 118 to expose an interior passage for receiving the inner drive spindle 116.

A wedge 122 is disposed in each pocket 120 for movement relative to the longitudinal axis of the elongate inner drive spindle 116. Each wedge 122 is moved longitudinally in response to relative rotation of the inner drive spindle 116 with respect to the outer drive spindle 118. Each wedge 122 includes a threaded surface 124 operably engageable with either a threaded portion 126 of the outer drive spindle 118, or a threaded portion of the inner drive spindle. The tool cartridge or body member 112 is operably engaged within each pocket 120 of the outer drive spindle 118 for radial movement relative to the longitudinal axis of the outer drive spindle 118 in response to relative movement of the corresponding wedge 122. A spring 128 is provided for urging each tool cartridge or body member 112 to operably engage with the corresponding wedge 122. The spring 128 preferably is provided in the form of a ring spring. The spring 128 urges each tool cartridge 112 into engagement with the corresponding wedge 122, while allowing the tool cartridge 112 to move radially in the pocket 120 as the wedge 122 moves longitudinally in response to relative rotation between the inner drive spindle 116 and the outer drive spindle 118. The spring 128 is selected to be sufficiently strong to maintain operable engagement between each tool cartridge 112 and the corresponding wedge 122, while the inner drive spindle 116 and outer drive spindle 118 rotate about a common longitudinal axis. The first drive 130 can be provided for rotating the inner drive spindle 116 and, through the planetary gear means 12a, 12b, the second drive spindle 118. A second drive 132 can be provided for rotating the inner drive spindle 116 at a differential rotational speed from the outer drive spindle 118. A controller 134 can be provided for controlling the relative rotation of the inner drive spindle 116 and the outer drive spindle 118 in response to at least one input signal. Input signals can be obtained from a user input device, such as a keyboard 136. Alternatively, or additionally, the input signal can include one or more sensors, such as a rotational speed sensor 138 to monitor the rotation of the outer drive spindle 118, and/or a rotational speed sensor 140 for monitoring the rotation of the inner drive spindle 116, and/or a position sensor 142 for monitoring the radial position of at least one tool cartridge 112, or the tool attached thereto. Input signals can also be provided from the first drive 130 and/or second drive 132 to the controller 134. One or more output signals can be provided from the controller 134. The output signals can include a signal to control the first drive 130 and/or the second drive 132. Alternatively, or additionally, an output signal can be provided from the controller 134 to a data output device 146, such as a storage unit, printer, display, network connection, or the like.

The controller 134 can include a central processing unit for receiving at least one electronic input signal and for generating at least one processed electronic output signal in accordance with a control program stored in memory. The controller 134 can be programmed to compensate for wear of a tool connected to each tool cartridge 112 with relative rotational movement of the inner drive spindle 116 with respect to the outer drive spindle 118. Alternatively, or additionally, the controller 134 can be programmed to adjustably position each tool cartridge 112 with respect to the outer drive spindle 118 during a machining operation in response to an input signal or during a calibration operation performed between machining operations. It is believed that control of the cutter 144 or other tool can provide the capability for forming more intricate machine profiles, and/or providing more efficient machining operations, and/or allowing simultaneous machining operations to be performed at different radial positions at the same time. The structure of the apparatus 110 can be precisely formed to provide the desired accuracy, reliability, and repeatability of the positioning movement of the radially moveable body member or tool cartridge 112.

The wedge 122 can include a shaped recess or aperture 146 adapted to receive a complementary shaped end portion 148 of the inner drive spindle 116. The end portion 148 of the inner drive spindle 116 is operably engaged within the shaped aperture 146 of the wedge 122 in order to drivingly engage the wedge 122 in rotation about a common longitudinal axis with the inner drive spindle 116. Engagement of the end portion 148 of the inner drive spindle 116 with the shaped aperture 146 allows longitudinal movement of the wedge 122 with respect to the inner drive spindle 116 as the wedge 122 and inner drive spindle 116 rotate together. The relative longitudinal movement of the wedge 122 is a result of differential rotational speeds between the inner drive spindle 116 and the outer drive spindle 118 which causes the threaded portion 124 of the wedge 122 to operably engage and interact with the threaded portion 126 of the outer drive spindle 118. Depending on the difference in rotational speed between the inner drive spindle 116 and the outer drive spindle 118, the wedge 122 is driven longitudinally in either direction. The first and second longitudinal end limits of travel of the wedge 122 can be defined by the radially inwardly extending ridge or collar 150 disposed within the groove or recess 152 of the wedge 122.

The invention has been described with respect to a first drive 130 for an inner spindle 116 and outer spindle 118, and a second drive connected to one of the first and second ring gears 14a, 14b for imparting differential rotational speeds to one of the corresponding first or second spindles 116, 118 connected to the appropriate sun gear 16a, 16b respectively. This provides a single drive for rotating the inner and outer drive spindles 116, 118 respectively, while incremental, differential movement of one of the spindles with respect to the other spindle is provided by a second drive. It is envisioned that an automatic tool compensation sequence between machining operations on workpieces could be provided with the present invention. By way of example, and not limitation, the position sensor 142 can provide a feedback signal to the controller 134 or central processing unit, to enable accurate adjustment of the position of the cutter 144 prior to the start of the next machining operation. The compensating adjustment step can occur during idle time of the machine tool while a workpiece or part is removed from the workstation and a new workpiece or part is delivered. Such modifications to the disclosed and illustrated configurations are envisioned as part of the present invention.

Figure 5:
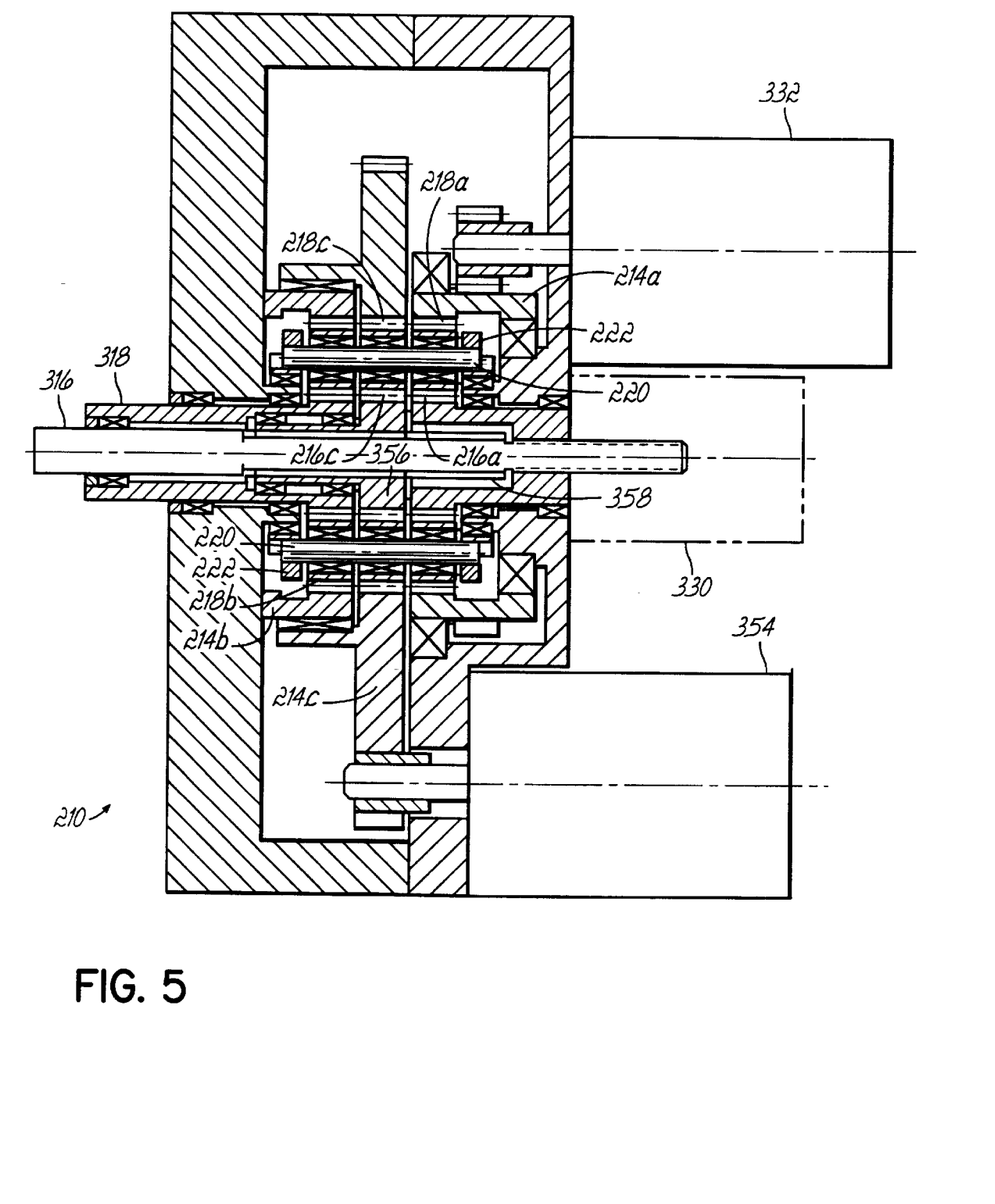
FIG. 5 is a cross-sectional view of an alternative planetary gear drive train according to the present invention adding a third planetary gear group for moving the compensation bar longitudinally.

Referring now to FIG. 5, the structural description and operation of the gear drive apparatus 210 is the same as previously described above for the gear drive apparatus 10 including the elements corresponding to the first planetary gear group 212a, the second planetary gear group 212b, the first ring gear 214a, the second ring gear 214b, first sun gear 216a, second sun gear 216b, first planetary gear 218a, second planetary gear 218b, common individual shafts 220, spider cage 222, primary drive 330, and secondary drive 332 which correspond respectively to the elements of the gear drive apparatus 10 including a first planetary gear group 12a, a secondary planetary gear group 12b, a first ring gear 14a, a second ring gear 14b, a first sun gear 16a, a second sun gear 16b, a first planetary gear 18a, a secondary planetary gear 18b, common individual shafts 20, spider cage 22, primary drive 130, and secondary drive 132.

The embodiment illustrated in FIG. 5 includes a third ring gear 214c. The third ring gear 214c can be interposed between the first ring gear 214a and second ring gear 214b. A third sun gear 216c is disposed radially inward from the third ring gear 214c. The third ring gear 214c and third sun gear 216c have a common central axis coaxial with the first shaft 316.

At least one, and preferably a plurality of third planetary gears 218c are positioned within the third ring gear 214c to operably engage between the third ring gear 214c and the third sun gear 216c. Preferably, the plurality of third planetary gears 218c are equal in number to the plurality of first planetary gears 218a, and second planetary gears 218b. Preferably, the third planetary gears 218c are mounted on the common individual shafts 220 for each matched group of first, second, and third planetary gears 218a, 218b, 218c. Alternatively, the third planetary gears 218c can be held in a fixed relative position with respect to the other planetary gears 218a, 218b while rotating with respect to the corresponding ring gears 214a, 214b, 214c, and sun gears 216a, 216b, 216c, respectively. This can provide a configuration where the first, second, and third planetary gears 218a, 218b, and 218c do not include a common axis of rotation, but are fixed in a predetermined angular offset orientation with respect to the common axis for the first, second, and third ring gears 214a, 214b, 214c, as the first, second, and third planetary gears 218a, 218b, 218c rotate and move about that common axis. This configuration would require a cage 222 of a different structural configuration from that illustrated in FIG. 5.

The illustrated embodiment of FIG. 5 includes a spider cage 222 for supporting the first, second, and third planetary gears 218a, 218b, 218c with respect to one another and with respect to the common axis between the first, second, and third ring gears 214a, 214b, and 214c. Preferably, the cage 222 supports the common individual shafts 220 for each matched group of first, second, and third planetary gears 218a, 218b, 218c, for movement with respect to the first, second, and third sun gears 216a, 216b, 216c, and corresponding, first, second, and third ring gears 214a, 214b, 214c in response to rotation of one of the first, second, and third sun gears 216a, 216b, 216c, and one of the first, second, and third ring gears, 214a, 214b, 214c.

A third drive 354 can be provided for rotating the third ring gear 214c relative to the first and second ring gears, 214a, 214b. Rotation of the third ring gear 214c with respect to the first ring gear 214a, and/or the second ring gear 214b, drives the first shaft 316 in longitudinal movement in either direction depending on the direction of rotation of the third drive 354. The input of the third drive 354 acts through the third ring gear 214c, third planetary gear 218c, to rotate the third sun gear 216c. The third sun gear 216c is connected to a nut 356 having a longitudinally extending passage there through with a threaded interior surface operably engageable with a threaded portion 358 of drive shaft 316. When the first drive shaft 316 is driven at a different rotational rate from the operably engaged nut 356, the threaded portions interact to drive the first shaft 316 longitudinally in a predetermined direction depending on whether the rate of rotation of the nut 356 is less than or greater than the rate of rotation of the first shaft 316. When the third drive 354 holds the third ring gear 214c stationary, the primary or first drive 130 rotates the cage 222 and correspondingly attached first, second, and third planetary gears 218a, 218b, 218c through common shafts 220 supported by the cage 222. Rotation of the cage 222 causes corresponding rotation of the first shaft 316, second shaft 318, and nut 356. The gear ratios are selected to drive the nut 356 at the same rotational rate as the first shaft 316 unless additional input is received from the third drive 354 to either decrease or increase the rate of rotation of the nut 356 with respect to the first shaft 316. As previously described, the gear ratios are also selected to drive the first shaft 316 at a rotational rate equal to the rate of rotation of the second shaft 318 when the second drive 332 holds the second ring gear 214b stationary. Additional input from the second drive 332 causes the rotational rate of the first shaft 316 to increase or decrease with respect to the rotational rate of the second shaft 318 depending on the direction of the input applied to the second ring gear 214b.

In the embodiment illustrated in FIG. 5, the controller (shown in FIG. 3) can receive additional input or signals indicating the longitudinal position of the first shaft 316. Input signals can also be provided from the third drive 354 to the controller 134. One or more output signals can be provided from the controller 134. The output signal can include a signal to the third drive 354 in addition to the other input and output signals provided. Alternatively, the second drive 332 and/or the third drive 354 could be manually operated as required for particular applications.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A gear drive apparatus comprising:
   a first planetary gear group including a fixed, stationary, first ring gear, a first sun gear positioned within the first ring gear, a plurality of first planetary gears positioned within the first ring gear and between the first ring gear and the first sun gear;

a second planetary gear group coaxial with the first planetary gear group and including a second moveable ring gear coaxial with the first ring gear, a second sun gear positioned within the second ring gear and coaxial with the first sun gear, a plurality of second planetary gears equal in number to the plurality of first planetary gears and positioned within the second ring gear between the second sun gear and the second ring gear, the first and second planetary gears mounted on common individual shafts for each matched pair of first and second planetary gears; and a spider cage supporting the common individual shafts for each matched pair of first and second planetary gears for movement with respect to the first and second sun gears and corresponding first and second ring gears in response to rotation of one of the first and second sun gears and the second ring gear.

2. The gear drive apparatus of claim 1 further comprising:

a primary motor for driving the second sun gear in rotation and through the plurality of first and second planetary gears for driving the first sun gear in synchronized rotation with the first sun gear.

3. The gear drive apparatus of claim 2 further comprising:

a secondary motor for selectively driving the second ring gear in rotation and for selectively holding the second ring gear stationary.

4. The gear drive apparatus of claim 3 further comprising:

the secondary motor for imparting selective differential speeds of rotation of the second sun gear with respect to the first sun gear.

5. The gear drive apparatus of claim 1 further comprising:

a third planetary gear group coaxial with the first and second planetary gear groups and including a third moveable ring gear coaxial with the first and second ring gears, a third sun gear positioned within the third ring gear and coaxial with the first and second sun gears, a plurality of third planetary gears equal in number to the plurality of first and second planetary gears and positioned within the third ring gear between the third sun gear and the third ring gear, the first, second, and third planetary gears mounted on the common individual shafts for each matched group of first, second, and third planetary gears; and the spider cage supporting the common individual shafts for each matched group of first, second, and third planetary gears for movement with respect to the first, second, and third sun gears and corresponding first, second, and third ring gears in response to rotation of one of the first, second, and third sun gears and the second and third moveable ring gears.

6. The gear drive apparatus of claim 5 further comprising:

a third motor for selectively driving the third ring gear in rotation and for selectively holding the third ring gear stationary.

7. The gear drive apparatus of claim 6 further comprising:

the third motor for imparting selective differential speeds of rotation of the third sun gear with respect to the first and second sun gears.

8. The gear drive apparatus of claim 1 further comprising:

the first and second ring gears having an identical number of gear teeth and identical pitch diameters.

9. The gear drive apparatus of claim 1 further comprising:

the plurality of first and second planetary gears having an identical number of gear teeth and identical pitch diameters.

10. The gear drive apparatus of claim 1 further comprising:

the first and second sun gears having an identical number of gear teeth and identical pitch diameters.

11. The gear drive apparatus of claim 1 further comprising:

control means in communication with the second sun gear and the second ring gear for coordinating the movement of the first sun gear and second ring gear to selectively produce synchronized and unsynchronized rotation of the first and second sun gears with respect to one another.

12. A gear drive apparatus comprising:

a first shaft;

a second shaft concentric to the first shaft; and planetary gear means for driving the first and second shafts in synchronized rotation with respect to one another with a single primary drive input and for selectively driving the first and second shafts in unsynchronized rotation with respect to one another in response to a secondary drive input and for driving the first shaft in longitudinal movement with respect to the second shaft in response to a third drive input.

13. The gear drive apparatus of claim 12 further comprising:

control means in communication with the primary and secondary drive inputs for coordinating the primary and secondary drive inputs to selectively product synchronized and unsynchronized rotation of the first and second shafts with respect to one another.

14. A gear drive apparatus comprising:

a first shaft;

a second shaft concentric to the first shaft; and planetary gear means for driving the first and second shafts in synchronized rotation with respect to one another with a single primary drive input and for selectively driving the first and second shafts in unsynchronized rotation with respect to one another in response to a secondary drive input; wherein the planetary gear means further comprises:

a first planetary gear group including a fixed, stationary, first ring gear, a first sun gear positioned within the first ring gear, a plurality of first planetary gears positioned within the first ring gear and between the first ring gear and the first sun gear;

a second planetary gear group coaxial with the first planetary gear group and including a second moveable ring gear coaxial with the first ring gear, a second sun gear positioned within the second ring gear and coaxial with the first sun gear, a plurality of second planetary gears equal in number to the plurality of first planetary gears and positioned within the second ring gear between the second sun gear and the second ring gear, the first and second planetary gears mounted on common individual shafts for each matched pair of first and second planetary gears; and a spider cage supporting the common individual shafts for each matched pair of first and second planetary gears for movement with respect to the first and second sun gears and corresponding first and second ring gears in response to rotation of one of the first and second sun gears and the second ring gear.

15. The gear drive apparatus of claim 14 wherein the primary drive input further comprising:

a primary motor for driving the second sun gear in rotation and through the plurality of first and second planetary gears for driving the first sun gear in synchronized rotation with the first sun gear.

16. The gear drive apparatus of claim 14 wherein the secondary drive input further comprises:
a secondary motor for selectively driving the second ring gear in rotation and for selectively holding the second ring gear stationary.

17. The gear drive apparatus of claim 16 further comprising:
the secondary motor for imparting selective differential speeds of rotation of the second sun gear with respect to the first sun gear.

18. The gear drive apparatus of claim 14 further comprising:
the first and second ring gears having inwardly directed gear teeth portions identical to one another.

19. The gear drive apparatus of claim 14 further comprising:
the plurality of first and second planetary gears being identical to one another.

20. The gear drive apparatus of claim 14 further comprising:
the first and second sun gears being identical to one another.

21. The gear drive apparatus of claim 14 wherein the planetary gear means further comprises:
a third planetary gear group coaxial with the first and second planetary gear groups and including a third moveable ring gear coaxial with the first and second ring gears, a third sun gear positioned within the third ring gear and coaxial with the first and second sun gears, a plurality of third planetary gears equal in number to the plurality of first and second planetary gears and positioned within the third ring gear between the third sun gear and the third ring gear, the first, second, and third planetary gears mounted on the common individual shafts for each matched group of first, second, and third planetary gears; and
the spider cage supporting the common individual shafts for each matched group of first, second, and third planetary gears for movement with respect to the first, second, and third sun gears and corresponding first, second, and third ring gears in response to rotation of one of the first, second, and third sun gears and the second and third moveable ring gears.

22. The gear drive apparatus of claim 21 further comprising:
a third motor for selectively driving the third ring gear in rotation and for selectively holding the third ring gear stationary.

23. The gear drive apparatus of claim 22 further comprising:
the third motor for imparting selective differential speeds of rotation of the third sun gear with respect to the first and second sun gears.

24. A gear drive apparatus comprising:
a first shaft;
a second shaft concentric to the first shaft;
first and second planetary gear systems for driving the first and second shafts in synchronized rotation with respect to one another with a primary drive input and for selectively driving the first and second shafts in unsynchronized rotation with respect to one another in response to a secondary drive input, each of the first and second planetary gear systems including a ring gear, a sun gear positioned within the ring gear, a plurality of planetary gears positioned within the ring gear and between the ring gear and the sun gear; and
a third planetary gear system for driving one of the first and second shafts in longitudinal movement with respect to the other shaft in response to a third drive input, the third planetary gear system including a ring gear, a sun gear positioned within the ring gear, a plurality of planetary gears positioned within the ring gear and between the ring gear and the sun gear.

25. The gear drive apparatus of claim 24 further comprising:
each ring gear having an inwardly directed gear teeth portion identical to one another, each plurality of planetary gears being identical to one another, and each sun gear being identical to one another.

26. The gear drive apparatus of claim 24 further comprising:
control means in communication with the primary and secondary drive inputs for coordinating the primary and secondary drive inputs to selectively produce synchronized and unsynchronized rotation of the first and second shafts with respect to one another.

27. The gear drive apparatus of claim 26 further comprising:
the ring gear having an inwardly directed gear teeth portion identical to the ring gears of the first and second planetary gear systems, the plurality of planetary gears being identical to the plurality of planetary gears of the first and second planetary gear systems, and the sun gear being identical to the sun gears of the first and second planetary systems.

28. The gear drive apparatus of claim 26 further comprising:
control means in communication with the third drive input for selectively longitudinally moving one of the first and second shafts with respect to the other.

29. A method for controlling synchronized rotation of elongate, concentric, rotatable first and second shafts comprising the steps of:
driving the first and second shafts in synchronized rotation with respect to one another with a single primary drive input with planetary gear means;
selectively driving the first and second shafts in unsynchronized rotation with respect to one another in response to a secondary drive input with the planetary drive means; and
selectively driving one of the first and second shafts in longitudinal movement with respect to the other with a third drive input with the planetary gear means.

30. The method of claim 29 further comprising the step of:
coordinating the primary and secondary drive inputs to selectively produce synchronized and unsynchronized rotation of the first and second shafts with respect to one another with control means in communication with the primary and secondary drive inputs.

31. The method of claim 29 further comprising the step of:
controlling the third drive input to selectively move the one of the first and second shafts with respect to the other with control means in communication with the third drive input.

* * * * *